(12) United States Patent
Todorov et al.

(10) Patent No.: US 9,037,688 B2
(45) Date of Patent: May 19, 2015

(54) SYSTEM HAVING TRACE RESOURCES

(75) Inventors: Vladimir Todorov, Munich (DE); Helmut Reinig, Isen (DE); Alberto Ghiribaldi, Ravenna (IT); Patrik Eder, Taufkirchen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 302 days.

(21) Appl. No.: 13/337,406

(22) Filed: Dec. 27, 2011

(65) Prior Publication Data
US 2013/0166701 A1    Jun. 27, 2013

(51) Int. Cl.
G06F 15/177    (2006.01)
H04L 29/08    (2006.01)
G06F 11/36    (2006.01)

(52) U.S. Cl.
CPC ............ *H04L 67/34* (2013.01); *G06F 11/3636* (2013.01)

(58) Field of Classification Search
CPC ..................................................... G06F 15/177
USPC .................................... 709/220, 224; 714/46
See application file for complete search history.

(56) References Cited

U.S. PATENT DOCUMENTS

| | | | | |
|---|---|---|---|---|
| 6,553,508 | B1 * | 4/2003 | Minyard ........................ | 714/4.5 |
| 2005/0033553 | A1 * | 2/2005 | Swaine et al. ................. | 702/176 |
| 2009/0268609 | A1 * | 10/2009 | Koch et al. ..................... | 370/222 |
| 2011/0214023 | A1 * | 9/2011 | Barlow et al. ................... | 714/46 |
| 2011/0317713 | A1 * | 12/2011 | Assarpour et al. ............. | 370/412 |
| 2012/0170573 | A1 * | 7/2012 | Poscher ......................... | 370/352 |

OTHER PUBLICATIONS

Ehab Anis Daoud et al., "Embedded Debug Architecture for Bypassing Blocking Bugs During PostSilicon Validation", IEEE Transacitons on VLSI Systems, vol. 19, No. 4, Apr. 2011, pp. 559-570.
Kuen-Jong Lee et al., "A Low-Cost SOC Debug Platform Based on On-Chip Test Architectures, IEEE, 2009, pp. 161-164.
Fu-Ching Yang et al., "An On-Chip AHB Bus Tracer With Real-Time Compression and Dynamic Multiresolution Supports for SoC" IEEE Transacitons on VLSI Systems vol. 19, No. 4, Apr. 2011, pp. 571-584.
Jianmin Zhang et al., "Debug Support for Scalable System-on-Chip", Seventh International Workshop on Microprocessor Test and Verification (MTV'06). IEEE, 2006.
Hyunbean Yi et al., "A Design-for-Debug (DfD) for NoC-based SoC Debugging via NoC" 17th Asian Test Symposium, IEEE Computer Society, 2008, pp. 289-294.
Kees Goossens et al., "Transaction-Based Communication-Centric Debug", Proceedings on the First International Symposium on Networks-on-Chip (NOCS'07), IEEE, 2007.

* cited by examiner

*Primary Examiner* — David Lazaro
*Assistant Examiner* — Marie Georges Henry
(74) *Attorney, Agent, or Firm* — Eschweiler & Associates, LLC

(57) ABSTRACT

A system includes a functional unit having a plurality of components. The system further includes trace resources for tracking processes executed by the functional unit. The trace resources include a network configuration having a plurality of nodes and a plurality of monitors, wherein each of the monitors is coupled to a node and is configured to determine trace information of a component. Further, a trace unit is coupled to the network configuration.

22 Claims, 6 Drawing Sheets

SYSTEM HAVING TRACE RESOURCES

FIELD OF THE INVENTION

The invention relates to electronic systems, and more particularly to techniques of tracing or debugging electronic systems.

BACKGROUND

Software development for programmable systems such as, e.g., System-on-a-Chip (SoC) is one of the most intriguing challenges in modern device development. It is well known that the functionality, performance, correct operation, usability and success on the market of a device are mostly determined by the software that is developed to run on the hardware of the device's programmable system. Therefore, a programmable system that provides support to the software developer by offering tracing/debugging solutions makes the system more transparent to the software developer and thereby decreases the effort and time spent in aligning the software to the hardware platform. Further, hardware errors of the hardware platform may delay time to market and should be detectable as early as possible.

BRIEF DESCRIPTION OF THE DRAWINGS

Aspects of the disclosure are made more evident by way of example in the following detailed description of embodiments when read in conjunction with the attached drawing figures, wherein.

DETAILED DESCRIPTION

Figure 1:
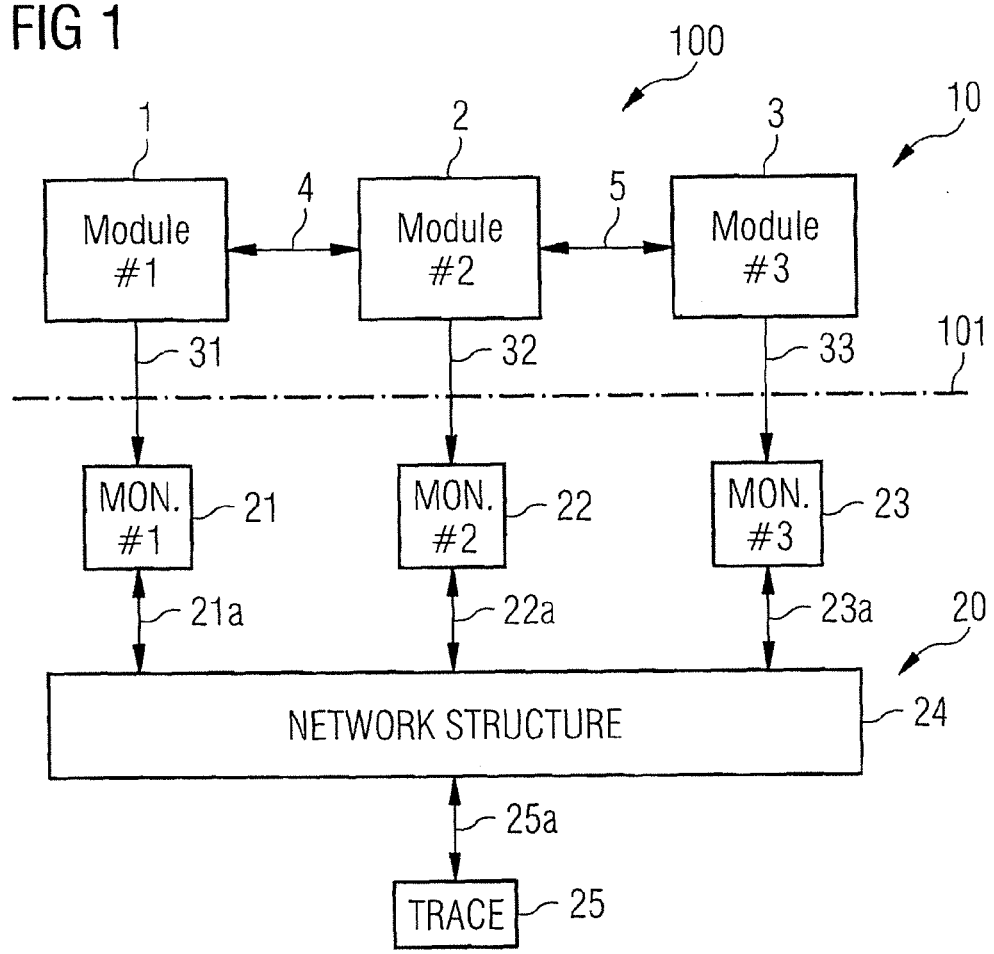
FIG. 1 is a schematic block diagram of a system comprising a functional unit and trace resources in accordance with the disclosure.

In the following detailed description, reference is made to the accompanying drawings, which form a part thereof, and in which is shown by way of illustration embodiments in which the invention may be practiced. It is to be understood that other embodiments may be utilized and structural or logical changes may be made without departing from the scope of the present disclosure. The following detailed description, therefore, is not to be taken in a limiting sense, and the scope of the present invention is defined by the appended claims.

It is to be understood that the features of the various exemplary embodiments described herein may be combined with each other, unless specifically noted otherwise. Further, like reference numerals designate corresponding similar parts.

As employed in this specification, the terms "coupled" and/or "connected" are not meant to mean in general that the elements must be directly coupled or connected together; intervening elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

It should be understood that embodiments may be implemented in discrete circuits, partially integrated circuits or fully integrated circuits. Further, embodiments of the invention may be implemented on a single semiconductor chip or on multiple semiconductor chips connected to each other.

The disclosure may include a functional unit comprising a plurality of programmable and/or non-programmable components. The components may comprise one or more of a programmable processor, a (e.g. programmable or non-programmable) memory, a (e.g. programmable or non-programmable) dedicated hardware block, a (e.g. programmable or non-programmable) hardware accelerator, an (e.g. programmable or non-programmable) interconnect through which multiple programmable processors, memories, dedicated hardware blocks, hardware accelerators or other components may interact, etc.

Components of the functional unit may be integrated on a single chip. In this case, the system comprising the functional unit may form a System-on-a-Chip (SoC). SoCs may contain one or more cached CPUs (Central Processing Units) and a complex, e.g. pipelined interconnect. The interconnect may arbitrate one or more masters to one or more slaves.

Components of the functional unit may further be distributed over multiple semiconductor chips connected to each other via an inter-chip interconnect. The multiple chips may be accommodated in a common housing of a single device, e.g. mounted on one or more boards contained in the device. Alternatively the multiple chips may be distributed over multiple separate and/or remote devices, wherein the multiple separate/remote devices are connected to each other via a network, e.g. internet, a wireless cellular network, etc.

The functional unit may be implemented to form a Network-on-a-Chip (NoC). A NoC is an integrated circuit that applies a network architecture to a single chip. In a NoC data is passed between logical nodes using packets. The components of the functional unit may be implemented by nodes of the network and/or by the network interconnect between the nodes of the NoC.

Tracing resources are provided for tracking processes executed by the functional unit. The tracing resources are involved to observe the functional unit in its target environment and are configured to trace the activity of the functional unit during operation, e.g. during the execution of software program(s).

The tracing resources may provide for debugging. Tracing resources configured for debugging are referred to as debugging resources throughout this disclosure.

The tracing resources may not only be used to trace or record the behavior of the functional unit during operation, but may additionally be configured to interact with the functional unit. In this case, the tracing resources are (also) capable of serving as a control infrastructure of the system.

Further to this case, the tracing resources may be configured to control the execution of the software program flows on the functional unit.

The tracing resources may comprise a network using packet-switched communication. The use of packet-switched communication may provide for high latency tolerance, high scalability and may allow a high level of concurrency during tracing the activity of the functional unit during operation. The tracing resources may provide for a NoC based tracing (debug) platform that may e.g. be used for SoC tracing (debugging).

The tracing resources may be implemented by an architecture which is added to and independent from the architecture of the functional unit of the system. Thus, the tracing resources may be implemented by an additional, dedicated interconnect infrastructure "orthogonal" to the main (functional) interconnect structure of the system on which the functional unit is based. This may render the whole tracing process invisible to the functional unit being observed. In this and other cases, the tracing resources may be completely non-intrusive to the program flow.

FIG. 1 illustrates an exemplary block diagram of a system 100 in accordance with the disclosure. System 100 may comprise a functional architecture 10 that is depicted above the dashed line 101 and a trace, debug or control architecture 20 that is depicted below the dashed line 101.

In the following, without loss of generality, the trace, debug or control architecture 20 will be referred to as a trace architecture 20. It is to be noted that throughout the entire description the trace architecture 20 may specifically be used for debugging, i.e. could form a debug architecture 20. Further, the trace architecture 20 may additionally be used for controlling the operation of the functional architecture 10. Controlling the operation of the functional architecture 10 may be for other purposes than software development/software debugging.

The functional architecture 10 may comprise modules or components 1, 2, 3. At least one of these components 1, 2, 3 is a programmable component. Components 1, 2, 3 may e.g. comprise a programmable processor, a dedicated hardware block, a (programmable) interconnect or a (programmable) memory. Components 1, 2, 3 may be interconnected via data links 4, 5.

By way of example, component 1 may e.g. be a processor or processor core programmable by software and operable to execute processes in the functional architecture 10. Component 2 may e.g. be an interconnect which may optionally be under the control of an interconnect software (e.g. a network interconnect under the control of protocol information, a crossbar structure, a bus or a dedicated hardware path under the control of programmable parameters). Component 3 may be, e.g. a programmable memory, a programmable interface under the control of interface software, another programmable processor, etc. The functional architecture 10 or a part thereof comprising a plurality of components 1, 2, 3 is also referred to as functional unit in the disclosure.

Functional architecture 10 may be implemented as an integrated circuit on a single chip, forming an SoC.

Components 1, 2, 3 contained in Functional architecture 10 may be distributed over a plurality of semiconductor chips. In this case, at least one of the data links 4, 5 comprises pins of a semiconductor chip.

Functional architecture 10 may be based on a network. In this case, components 1, 2, 3 may each provide a logical node of the network, and packets including a header, which addresses components 1, 2, 3, are transferred by data links 4, 5 through the network.

Trace architecture 20 may comprise monitors 21, 22, 23, a network structure 24 bi-directionally coupled to the monitors 21, 22, 23 and a trace, debug or control unit 25 bi-directionally coupled to the network structure 24. Bi-directional data links coupling monitors 21, 22, 23 and the trace, debug or control unit 25 to the network structure 24 are denoted by the reference numerals 21a, 22a, 23a and 25a, respectively. Data packets having a header for addressing the monitors 21, 22, 23 or the trace, debug or control unit 25 are transmitted via the data links 21a, 22a, 23a and 25a, respectively, and via the network structure 24.

In the following, without loss of generality, the trace, debug or control unit 25 will be referred to by way of example as a trace unit 25. However, it is to be noted that throughout the entire description trace unit 25 may specifically be a debugger and/or may comprise some control functionality for controlling the operation of the functional architecture 10. Further, trace unit 25 may comprise a plurality of separate and/or remote units, i.e. the functionality of the trace unit 25 such as e.g. collect trace information, debug commands or control operation of trace architecture 20 or functional architecture 10 may be distributed over a plurality of functional blocks within one chip, over a plurality of chips and/or over a plurality of remote devices.

Trace architecture 20 may be implemented as a network, i.e. by packet-switched communication means, or trace architecture 20 may be implemented on a single chip, forming a NoC. In this case, all monitors 21, 22, 23, the network structure 24 and the trace unit 25 are formed by an integrated circuit on one semiconductor chip. This semiconductor chip may be identical to the semiconductor chip on which functional architecture 10 is established (which, optionally, could also be implemented as a network).

Monitors 21, 22, 23, network structure 24 and trace unit 25 may be distributed over a plurality of semiconductor chips. In this case, at least one monitor 21 and a first part of network structure 24 are implemented on a first semiconductor chip, whereas at least a second monitor (e.g. monitor 22 or 23) and a second part of network structure 24 are implemented on a second semiconductor chip. Network structure 24 may comprise pins or other inter-chip interconnects for packet transmission.

Network structure 24 may be configured to show a ring topology, e.g. comprising one or more network rings in which a plurality of nodes are connected to each other in a closed loop configuration. Alternatively, network structure 24 may be configured to show other topologies such as, e.g., a star topology, a bus topology, etc.

Monitors 21, 22, 23 are coupled to components 1, 2, 3 by observation channels 31, 32 and 33, respectively. Observation channels 31, 32, 33 allow the monitors 21, 22, 23 to obtain trace or debug information from the components 1, 2, 3, respectively. That is, each monitor 21, 22, 23 may observe the activity of one component 1, 2, 3 during operation, encapsulate the trace or debug information indicative of the activity of the component 1, 2, 3 under observation into one or more packets and may send this or these packets to the trace unit 25. It is to be noted that the monitors 21, 22, 23 may trace programmable components 1, 2, 3 but may also trace non-programmable components 1, 2, 3, such as e.g. memories, dedicated hardware blocks, hardware accelerators, interconnects etc.

As will be explained in more detail further below, components 1, 2, 3 may be observed on processor instruction level. That is, commands and addresses are obtained via observation channels 31, 32, 33. Components 1, 2, 3 may be observed on transaction level. That is, commands, addresses and data are obtained via observation channels 31, 32, 33. Transactions are the result of processor instructions that cause activity on programmable processors (e.g. components 1 and/or 3) and on interconnect (e.g. component 2).

It is to be noted that system 100 may allow for software debug (which may take place e.g. at instruction level), for hardware debug (which may take place e.g. at instruction level and may be performed at the level of clock cycles) and for system-level debug (i.e. of multiple programmable or non-programmable components 1, 2, 3) which may e.g. take place at transaction level and may be performed on transaction cycles instead of clock cycles.

On transaction level, properties of transactions such as addresses and commands and data may be packetized by the monitors 21, 22, 23 and transmitted via the network structure 24 to the trace unit 25, e.g. a debugger.

Observation channels 31, 32, 33 may be supplemented by control channels (not illustrated) that establish a connection from the monitors 21, 22, 23 to components 1, 2, 3, respectively, i.e. by establishing bi-directional channels between the above-mentioned entities. In this case, trace architecture 20 can be extended to not merely observe but also to interact with functional architecture 10 if required. In this case, trace architecture 20 may also be capable of serving as a control infrastructure for affecting the program-controlled operation of the functional architecture 10. By way of example, trace architecture 20 may pass control information to the different components 1, 2, 3 that are coupled by control channels to monitors 21, 22, 23 (which, in this case, could also be referred to as monitor/control units). That way, throughout the entire description, trace architecture 20 may also be used for system tuning. It is to be noted that trace architecture 20 may be independent of the information that is transferred to it, i.e. trace/debug information from functional architecture 10 to trace unit 25 and/or control information from trace unit 25 of trace architecture 20 to functional architecture 10.

A large variety of electronic devices and applications may implement structure 100. By way of example, devices and applications which may implement structure 100 are e.g. electronic devices such as mobile devices, wireless devices, control units, etc. By way of example, mobile phones, smart phones, tablet PCs, motor control units for automobile applications etc. may be equipped with structure 100 according to the disclosure herein, wherein it is the functional architecture 10, which comprises circuitry to implement the device functions.

In the following a variety of embodiments and implementations of the trace architecture 20 are described. The details of the various embodiments that are described below may be likewise applied to the structure 100 of FIG. 1. Vice versa, concepts and implementations of the structure 100 as described above may be likewise applied to the embodiments below, unless explicitly stated to the contrary or technically prohibited.

Figure 2:
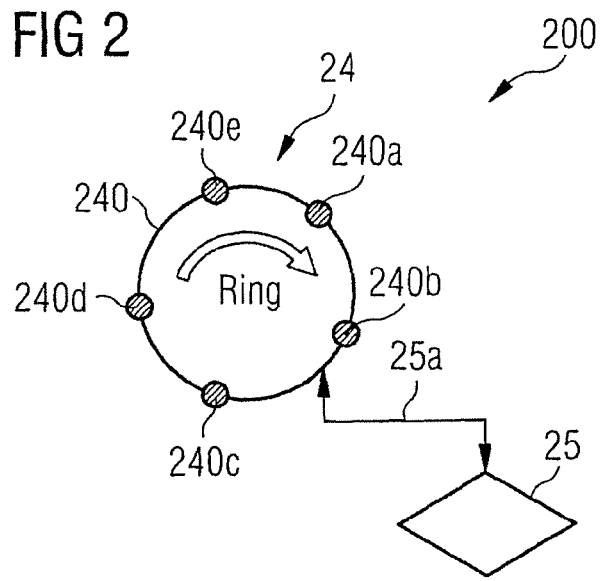
FIG. 2 is a schematic block diagram of an exemplary architecture and topology of trace.

FIG. 2 illustrates an exemplary architecture and topology of a trace architecture 200, which may comprise a network structure 24 containing a network ring 240.

Network ring 240 may comprise nodes 240a, 240b, 240c, 240d, 240e residing directly on network ring 240. Nodes 240a-240e of network ring 240 may be, e.g. routers. As will be explained in more detail below, nodes 240a-240e may be coupled via bi-directional links 21a, 22a, 23a to monitors 21, 22, 23, respectively, as illustrated in FIG. 1. Further, trace unit 25 may be coupled via bi-directional data link 25a to the network ring 240.

A network node 240a-240e may be associated with a monitor. By way of example, monitor 21 may be associated with node 240a and may pass trace information via bi-directional data link 21a to node 240a; monitor 22 may be associated with node 240b and may pass trace information via bi-directional data link 22a to node 240b; and monitor 23 may be associated with node 240c and may pass trace information via bi-directional data link 23a to node 240c. As already mentioned, control information may be forwarded in the opposite direction from nodes 240a-240e to monitors/control units 21, 22, 23.

In order to reduce the implementation expenditure, network ring 240 may be unidirectional. Thus, information (i.e. packets) can be forwarded only in one direction (clock-wise or counter clock-wise). This implies that some latency may be experienced by the packets travelling on the network ring 240. However, as will be better understood further below, travelling time of packets may not be a latency critical process. In other words, using packet-switched communication on a ring topology as exemplified in FIG. 2 may provide for latency tolerant tracing/debugging. Further, ring topology, e.g. network ring 240, may be scalable and therefore may be easily adapted to most different designs of the functional architecture 10. Further, the use of a packet-switched communication, e.g. on a single semiconductor chip (NoC), allows for a high level of concurrency in detecting activities of components 1, 2, 3 of the functional architecture 10. Further, instead of using a network ring 240, other network topologies such as, e.g., a star, a bus, etc could be employed.

Figure 3:
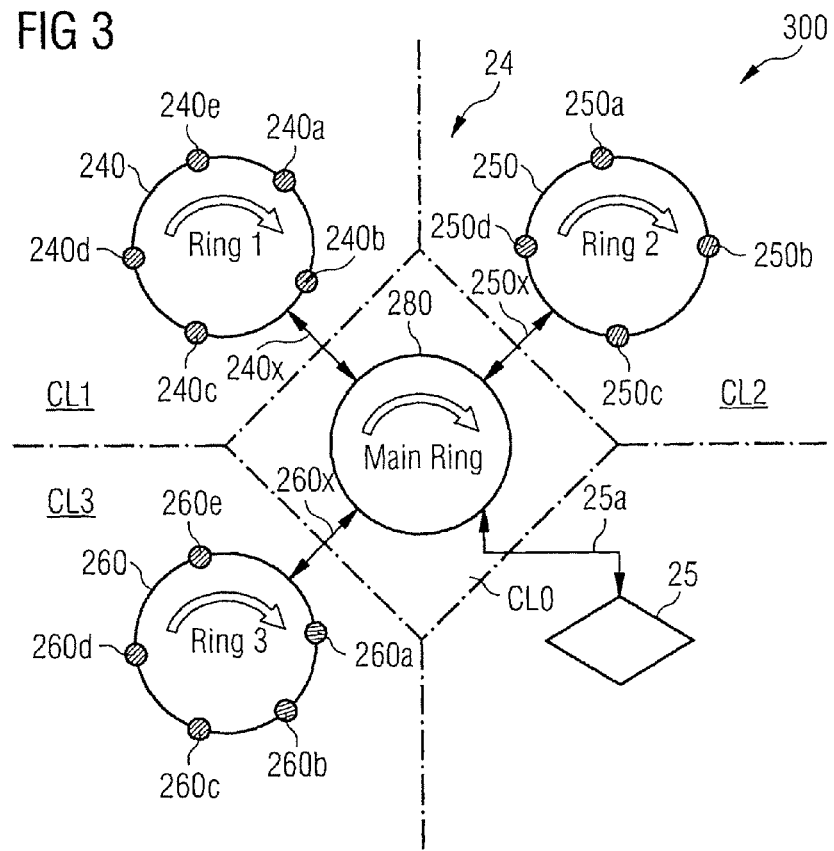
FIG. 3 is a schematic block diagram of an exemplary architecture and topology of trace.

FIG. 3 illustrates a schematic block diagram of an architecture and topology of an exemplary trace architecture 300 in accordance with the disclosure. Trace architecture 300 may comprise a hierarchical network structure 24. More specifically, network structure 24 may comprise a plurality of network rings 240, 250 and 260 and one main ring 280. Network rings 240, 250, 260, also referred to as Ring 1, Ring 2, Ring 3, respectively, are each coupled to the main ring 280 via bi-directional data links 240x, 250x and 260x, respectively. The main ring 280 may be coupled to the trace unit 25 via bi-directional data link 25a. In all network rings 240, 250, 260 and 280, nodes may be connected to each other in a closed loop configuration.

Main ring 280 may serve as a backbone, transferring information between trace unit 25 and different network rings 240, 250, 260 in both directions. More specifically, trace information obtained by each of network rings 240, 250, 260 may be transmitted to main ring 280 and then from main ring 280 to trace unit 25. On the other hand, control information such as e.g. monitor control information or control information to cause monitors (control units) to interact with the functional architecture 10 may be packetized by trace unit 25 into packets and transmitted via main ring 280 and respective network rings 240, 250, 260 to its destination node, e.g. one of the nodes 240a-e of network ring 240. Nodes of network ring 250 are denoted by reference numerals 250a, 250b, 250c and 260d, and nodes of network ring 260 are denoted by reference numerals 260a, 260b, 260c, 260d, 260e.

FIG. 3 illustrates a topology in which one main ring 280 interconnects to one or a plurality of network rings 240, 250, 260. Network rings 240, 250, 260 may each be associated with one subsystem of functional architecture 10. Further, instead of using one or more network configurations in the form of rings 240, 250, 260 and/or a main ring 280, one or more of these network configurations may be replaced by network configurations of other topologies such as, e.g., a star, a bus, etc.

Each subsystem of functional architecture 10 may be defined by a specific clock domain. In other words, functional architecture 10 may comprise circuitry blocks running on different clocks, i.e. defining different clock domains. Each circuitry block or subsystem of functional architecture 10 may be associated with one network ring 240, 250, 260. In this case, each network ring 240, 250, 260 may run on a different clock.

By way of example, network ring 240 may be implemented in trace architecture 20 and may be associated with functional architecture 10 of a first clock domain CL1, second network ring 250 may be implemented in trace architecture 20 and may be associated with functional architecture 10 of a second clock domain CL2, third network ring 260 may be implemented in trace architecture 20 and may be associated with functional architecture 10 of a third clock domain CL3, and the main ring 280 may be implemented in trace architecture 20 of a main ring clock domain CL0. In FIG. 3 clock domains CL1, CL2, CL3, CL0 of structure 100 (e.g. of a single semiconductor chip) are illustrated by dashed lines indicating borders of the respective clock domains. Each clock domain CL1, CL2, CL3, CL0 might be viewed as e.g. a "frequency island" having an individual clock, and may at least temporally be different from one another. Different clocks may have different clock cycles, e.g. the frequency of the first clock of clock domain CL1 may at least temporally be different from the frequencies of one or more of the other clocks of clock domains CL2, CL3, CL0. Clocks of different clock frequencies may be generated by different clock sources. However, different clocks in clock domains CL1, CL2, CL3 may also be generated by a single or common clock source, e.g. if at least one of the clocks of clock domains CL1, CL2, CL3, CL0 is (temporally) gated.

Each subsystem of functional architecture 10 may be defined by a specific power domain. In this case, functional architecture 10 may comprise circuitry blocks having different power sources, i.e. defining different power domains. For example, each of the network rings 240, 250, 260 may be interconnected to one subsystem or power domain. In this case, each network ring 240, 250, 260 may be associated to a subsystem which has its own power supply. Each power supply may be configured to independently turn off and/or turn on its respective subsystem/network ring 240, 250, 260. It is to be noted that in general, the terms "turn on" and "turn off" as used herein are not restricted to power gating. Rather, their meaning is intended to broadly cover other ways of switching on or switching off circuitry, such as by, e.g. clock gating.

In other words, the subsystems may be voltage or power domains rather than clock domains. Further, the subsystems may be combined clock and voltage or power domains, i.e. different subsystems have both an individual clock and an individual voltage/power supply. In general each network ring 240, 250, 260 may be associated with a subsystem of system 100 defined by a specific clock domain and/or a specific power domain of functional architecture 10 and trace architecture 20. By way of example, a JPEG compression block, a video compression block, an audio compression block, a WiFi block, a user interface, e.g. of a touch screen display, a voice control unit or a keypad may each implement one subsystem.

The hierarchical ring network topology of trace architecture 300 as e.g. illustrated in FIG. 3 allows for the complete removal (switch off) of individual subsystems without affecting the debug/trace process. By way of example, if clock domain CL1 (or a corresponding power domain) is switched off, components 1, 2, 3 of the functional architecture 10 and the first network ring 240 within the trace architecture 20 of the system 100 are disabled. However, the operation of the second network ring 240 in the second subsystem (e.g. clock domain CL2 and/or a corresponding power domain) and the operation of the third network ring 250 in the third subsystem (e.g. clock domain CL3 and/or a corresponding power domain) are unaffected by switching off the first subsystem.

The subsystem in which the main ring 280 is implemented (e.g. main ring clock domain CL0 and/or a corresponding power domain) may never be turned off (shut down) and/or may have a constant clock over time. This may guarantee that packets exchanged between main ring 280 and network rings 240, 250, 260 connected to main ring 280 are always transferred to the trace unit 25 or, vice versa, and packets sent from the trace unit 25 are always transferred via the main ring 280 to the target ring 240 or 250 or 260.

Trace unit 25 may reside in a subsystem different from the subsystems exemplified by CL1, CL2, CL3, CL0 in FIG. 3. For example, trace unit 25 may be implemented in one of the subsystems illustrated in FIG. 3, e.g. in the subsystem exemplified by CL0 having a constant clock or power. All subsystems may be provided on a single semiconductor chip, leading to a NoC trace architecture 20. Alternatively, one or more of the subsystems may be provided off-chip or may even be provided in different devices, leading to a network distributed over several chips and/or devices. In this case, by way of example, the trace units 25 may be an external trace unit implemented e.g. in a computer which may be connected to the electronic device under consideration.

The number of network rings 240, 250, 260 connected to the main ring 280 may be arbitrary. Different subsystems (e.g. clock or power domains) may have different network rings 240, 250, 260 or may even share a network ring 240, 250, 260. Furthermore, a single subsystem may accommodate more than one network ring 240, 250, 260.

In some embodiments, as mentioned earlier and illustrated by way example in FIG. 2, the main ring 280 could be dropped and, in case of a plurality of network rings 240, 250, 260, these rings could be directly (i.e. without intervening main ring 280) connected to each other. These embodiments may be of particular interest if turning off of subsystems is not allowed or is impossible.

Further, the number of nodes on a single network ring 240, 250, 260 is arbitrary. It is however to be noted that the address space for addressing the nodes/monitors should be sufficiently large as to accommodate all the nodes 240a-e, 250a-d, 260a-e of rings 240, 250 and 260, respectively.

It is to be noted that the subsystems in functional architecture 10 may use different protocols and/or different types of transactions. That is, the protocols or the kinds of transactions, which the monitors associated with different network rings observe, can be different depending on the subsystem in which the nodes/monitors are implemented.

Further, the protocols and transactions which the monitors associated with a single network ring 240, 250, 260 observe can be different depending on the components 1, 2, 3 being observed in the functional architecture 10 of the corresponding subsystem. This allows the trace architecture 20 to be applied to systems 100 consisting of components 1, 2, 3 with heterogeneous interfaces. By way of example, referring to FIG. 1 and FIG. 3, monitor 21 coupled to e.g. node 240a of ring 240 may observe transactions of component 1 based on a first protocol, monitor 22 coupled to e.g. node 240b of ring 240 may observe transactions of component 2 based on a second protocol, and monitor 23 coupled to e.g. node 240c of first ring 240 may observe transactions of component 3 based on a third protocol, wherein the first, second and third protocols may be different.

Packetizing the transactions (or trace information based thereon) of a specific protocol may be dependent on the protocol itself. Therefore, referring to the above example, monitors 21, 22 and 23 may use different packetizing processes adapted to the respective protocols or transactions used in components 1, 2 and 3, respectively.

As will be explained in more detail in conjunction with FIG. 5, each node 240a-240e, 250a-250d and 260a-260e may be a router. Further, each node 240a-240e, 250a-250d and 260a-260e may be coupled to a monitor such as e.g. monitors 21, 22, 23. The number of monitors per network ring 240, 250, 260 may be different. It is to be noted that the number of monitors 21, 22, 23 per network ring may vary and does not need to be balanced among the rings.

Figure 4:
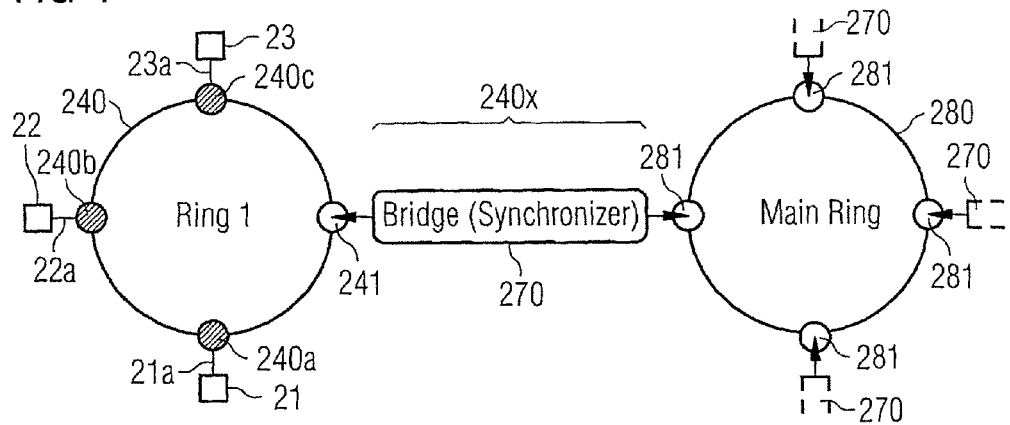
FIG. 4 is a schematic block diagram of an exemplary detail of the architecture and topology depicted in FIG. 3.

FIG. 4 illustrates a network connection between a network ring (or a network configuration having another topology such as, e.g., a star, a bus, etc.) and the main ring (or a network configuration having another topology such as, e.g., a star, a bus, etc.) in accordance with the disclosure. By way of example, network ring 240 is shown to be connected to the main ring 280. In this example, network ring 240 contains three nodes 240a, 240b, 240c which are coupled to monitors 21, 22 and 23, respectively, and one node 241, which is coupled to a node 281 on the main ring 280 via a synchronizer 270. Synchronizer 270 may be a bridge. The nodes 240a, 240b, 240c and 241 on the network ring 240 and nodes 281 on the main ring 280 may be routers.

In the following, without loss of generality, nodes 240a-240e, 250a-250d and 260a-260e will be referred to as routers. FIG. 5 illustrates by way of example router 240a coupled to monitor 21 via bi-directional data link 21a in accordance with one embodiment.

Router 240a may have two bi-directional ports, namely Port 0 and Port 1. Port 0 is connected to the ring structure of network ring 240. More specifically, router 240a has a first input 243 receiving packets from the ring structure of network ring 240 and has a first output 244 sending packets out to the ring structure of network ring 240. Port 1 may be connected to a monitor M, e.g. monitor 21. Router 240a may have a second input 245 receiving packets from monitor 21 and may have a second output 246 sending packets to monitor 21. The first input/output 243, 244 is associated with Port 0, the second input/output 245, 246 is associated with Port 1.

Node 241, which bridges the network ring 240 to the main ring 280, may likewise be a router. Router 241 may also have two bi-directional ports (Port 0 and Port 1) as depicted in FIG. 5. Port 0 of router 241 is connected to the ring structure of network ring 240. Port 1 of router 241 may not be connected to a monitor. Instead, Port 1 may be connected to synchronizer or bridge 270 and is used to communicate with the main ring 280.

In the main ring 280, all nodes or routers 281 may be designed similar to router 241. The routers 281 connect to synchronizers (bridges) 270 bridging to other network rings, e.g. to network rings 250, 260, etc.

The two port routers as described herein may have two input buffers. In this case, a first input buffer 243a is associated with Port 0 and buffers data packets received at input 243. A second input buffer 245a is associated with Port 1 and buffers data packets received at input 245, as illustrated in FIG. 5.

Alternatively, the routers may have no output buffers. Thus, output 244 connecting to the ring structure and output 246 connecting to a monitor 21 or a synchronizer (e.g. bridge) 270 may be unbuffered.

Figure 6:
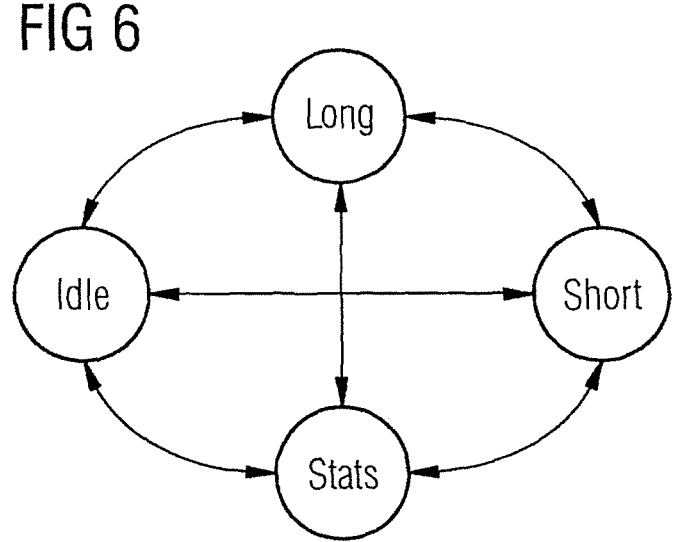
FIG. 6 is an illustration of a state diagram of a monitor.

Monitors 21, 22, 23 may be programmable to operate in different monitor modes. By way of example, a state diagram illustrating e.g. four different monitor modes is illustrated in FIG. 6.

A first monitor mode, IDLE, disables the monitor and does not produce any data traffic. The monitor is switched off.

A second monitor mode, STATISTICS (stats), causes the monitor to provide statistical information on observations of component activity. By way of example, the mode STATISTICS may cause the monitor to count a number of occurrences within some specific time frame and to report the statistical information to trace unit 25. By way of example, the number of observed transactions may be obtained and periodically reported to trace unit 25.

A third monitor mode, SHORT MESSAGE (short), may cause the monitor to packetize only the command and address of each transaction and transmit this trace information at each observation of a transaction to trace unit 25.

A fourth monitor mode, LONG MESSAGE (long), may cause the monitor to packetize the whole transaction (command, address, data) and transmit this "complete" trace information to trace unit 25. As illustrated in FIG. 6 by arrows, state transitions between each of the monitor modes are possible by reprogramming the monitor.

The monitor modes define the granularity of trace information that is transmitted to trace unit 25. The finer the granularity, the greater the bandwidth required by a monitor to transmit its observations. By way of example, e.g. the third and fourth modes may encounter the problem of traffic congestion while sending their observations as packetized trace information to the trace unit 25. This may happen due to large amounts of data being observed. In such cases, packets informing on incomplete transmittal of trace information may be generated by the monitor 21, 22, 23 and send out to the trace unit 25.

By way of example, if it is not possible for a monitor 21, 22, 23 to packetize the entire trace information during a mode (e.g. during SHORT MESSAGE mode or during LONG MESSAGE mode) due to traffic congestion or bandwidth limitations, the monitor 21, 22, 23 may be configured to generate loss statistics indicative of a statistical information on lost (i.e. not transmitted) trace information, packetize the loss statistics into one or more packets and send them to the trace unit 25. By way of example, the loss statistics may comprise the number and/or types of observations that were not transmitted. The loss statistics may e.g. be packetized in specific packets referred to as loss information packets or may be incorporated into other packets, e.g. added to packets carrying trace information. By way of example, if p observations were lost, an information that p observations were lost may be included in a loss information packet or added to the next packet carrying the trace information concerning the p+1 observation. By way of example, the added information may be a bit sequence indicative of the number of p, or may e.g. be any other binary coded loss statistics concerning the p lost observations.

Further, a monitor may be configured to trim the data content of an observation in order to reduce packet size. By way of example, during the LONG MESSAGE mode in which data of a transaction is encapsulated in addition to address and command information, only a part of the observed data may be transmitted to trace unit 25.

Programming the monitors 21, 22, 23 may be, e.g. accomplished by trace unit 25 or any other control unit associated with network structure 24. To that end, trace unit 25 (or the corresponding control unit) outputs a data packet carrying control information used to program the target monitor's behavior, e.g. to set a monitor state of the target monitor 21, 22, 23. This feature may enable future extensions of the functionality of the monitors.

Thus, in more general terms, two paths of information exist, namely one path from main ring 280 to network ring 240, 250, 260 and one path from network ring 240, 250, 260 to main ring 280. For simplicity, these two paths will be referred to as upstream and downstream, respectively. The downstream path may carry debug and/or trace information from monitors 21, 22, 23 down to trace unit 25. Therefore, the downstream path may be responsible for the majority of the data traffic in network structure 24. The upstream path, on the other hand, may carry control information in the opposite direction, i.e. from main ring 280 to network ring 240, 250, 260. This control information, encapsulated in a control packet, may be used to program monitors 21, 22, 23, e.g. in accordance with the state diagram of FIG. 6.

As mentioned earlier, control information encapsulated in control packets may further be used to program monitors 21, 22, 23 to interact with components 1, 2, 3 of functional architecture 10. In this case, trace architecture 20 may additionally be used to control the operation of functional architecture 10. That way, the functionality of trace architecture 20 may not be restricted to the mere observation of activity (instructions, transactions) of components 1, 2, 3 of functional architecture 10 but may additionally be used to control or manipulate program execution of functional architecture 10.

Arbitration between ports (Port 0 and Port 1) of routers 240a-240c, 241 (see FIG. 4) may be accomplished by weights. For example, a Round-Robin algorithm with weights may be used. By way of example, each port of each router 240a-240c, 241 may be allocated a specific weight. The weights determine the probability of choosing a specific port. As will be explained in more detail further below, arbitration (e.g. determination of weights) may be implemented either locally in network nodes (e.g. routers 240a-240c, 241) or in a central unit such as, e.g., trace unit 25.

Figure 7:
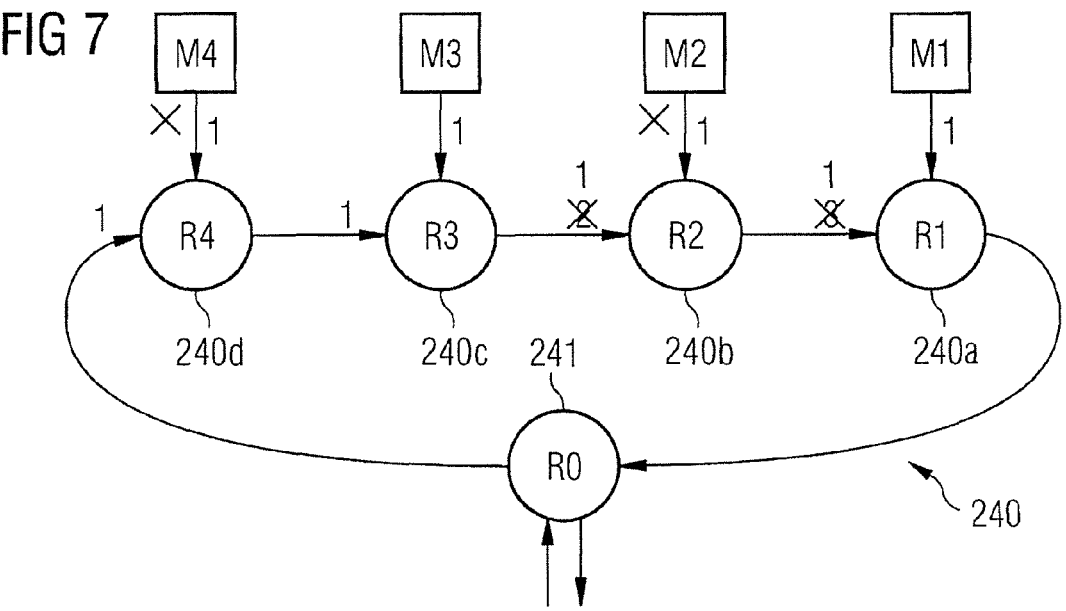
FIG. 7 is a schematic block diagram of a network ring illustrating a node arbitration policy in accordance with the disclosure.

Static weights may be used for each port of a router 240a-240c, 241. These static weights are predefined and not changeable. By way of example, FIG. 7 illustrates a network ring 240 comprising four routers R1, R2, R3, R4 (corresponding to 240a-240d) associated with monitors M1, M2, M3, M4, respectively, and one router R0 (corresponding to 241) used for bridging to the main ring 280 or directly to the trace unit 25 (not shown). Again, the network ring 240 is merely an example and could be replaced by network configurations having other topologies such as, e.g., a star, a bus, etc. By way of example, static weights of (Port 0:Port 1) may initially be chosen (3:1) for router R1, (2:1) for router R2, (1:1) for router R3 and (1:1) for router R4. That way, fairness among the communicating monitors M1-M4 can be achieved.

Still referring to FIG. 7, arbitration weights of the routers R1, R2, R3, R4 may be variable in time. Variability of weights may e.g. be used to ensure monitor fairness under varying monitor operation conditions or to guarantee that router-specific trace information may reach the output 244 of Port 0 of a router R1-R4 within a given, reasonable latency limit.

In the first case, if fairness among the communicating monitors M1-M4 shall be achieved, weights may be adjusted dynamically according to the example illustrated in FIG. 7. In a first phase of operation all monitors M1-M4 are considered to be enabled, i.e. to operate in a state other than IDLE. In this case, (Port 0:Port 1) weights of routers R1, R2, R3, R4 may be adjusted the same way as in the static case, i.e. (3:1), (2:1), (1:1) and (1:1), respectively. Then, it is assumed that the monitors M2 and M4 are switched off, i.e. are programmed to proceed to the IDLE state. Switching off the monitors M2 and M4 is indicated in FIG. 7 by crosses next to monitors M2 and M4. In a second phase of operation, the weights of router R1 and router R2 are adjusted to (1:1) and (1:1) to ensure fairness also in the second phase of operation. In this specific example, only Port 0 weights are adjusted, however, Port 1 weights may likewise be adjusted.

In the second case, if trace information from a specific monitor M1-M4 shall be privileged, router weights may also be changed dynamically in order to ensure appropriate bandwidth and latencies for the packet(s) encapsulating trace information from the favored component 1, 2, 3 to which the specific monitor to be privileged is attached. This may e.g. be accomplished by increasing the Port 1 weight of the router to which the monitor to be privileged is communicating. In this specific example, only Port 1 weights are adjusted, however, Port 0 weights may likewise be adjusted.

Arbitration may be implemented locally in network nodes (e.g. routers R1-R4). By way of example, weight adjustment, whether applied for the purpose of fairness (first case) or unfairness (second case), may be accomplished by a router R1-R4 in response to one or more state change packets transmitted by monitors M1-M4 associated with other routers R1-R4. Each monitor M1-M4 may generate and transmit a state change packet once it undergoes a (e.g. specific) state transition.

Figure 8:
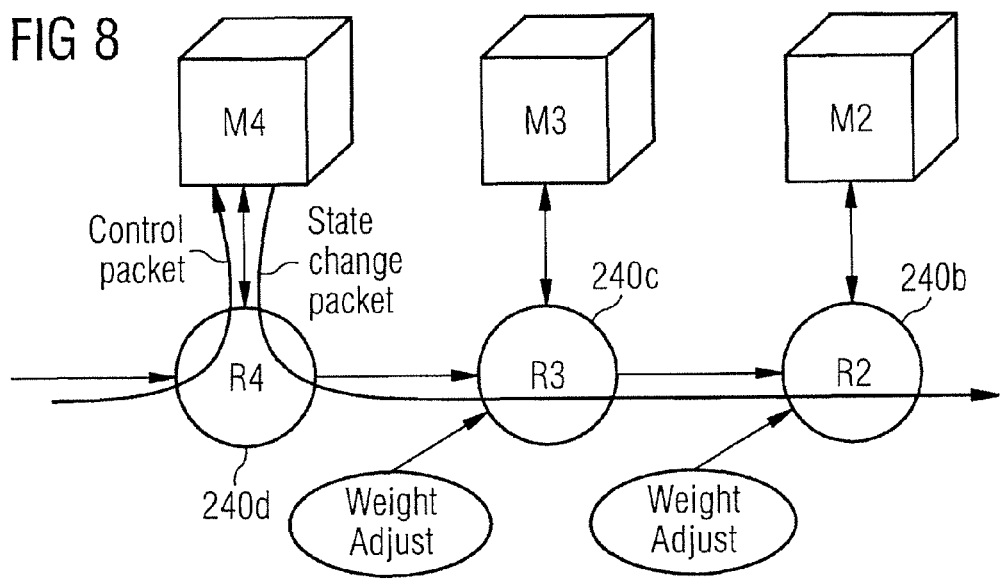
FIG. 8 is a schematic block diagram of nodes of a network ring illustrating node weight scaling.

Port weights may be adjusted at a router in response to received state change packets. FIG. 8 illustrates an example. Monitor M4 receives a control packet programming monitor M4 to operate in one of the monitor states. Monitor M4 may transmit a state change packet in response to a state transition. This state change packet leaves router R4 at the output 244 of Port 0 and is circulated through the ring network, thereby passing router R3, router R2 etc. Router R3 may detect the state change packet from monitor M4 and may adjust the weight of Port 0. Similarly, router R2 may detect the state change packet from monitor M4 and may adjust the weight of Port 0.

In an example, only two different state change packets may exist. In this case, one of these two state change packets is issued if the monitor state is switched to IDLE (i.e. the monitor is switched off). The other one of the two state change packets is issued if the monitor state is switched to one of the states STATISTICS, SHORT MESSAGE and LONG MESSAGE. In this specific example, a state change packet issued by a monitor M1-M4 merely indicates the on or off state of the corresponding monitor M1-M4 which has issued the state change packet. Routers R1-R4 receiving this state change packet may then adjust their port weight(s) accordingly. Returning to FIG. 7, by way of example, router R2 and router R4 may issue a state change packet indicating that these routers have passed to the IDLE state. Router R3 will not adjust its Port 0 weight on receiving the state change packet of router R4, router R2 will adjust its Port 0 weight from 2 to 1 on receiving the state change packet of router R4 and router R1 will adjust its port weight from 3 to 1 on receiving the state change packets from router R4 and router R2. Thus, using these or other concepts, router port weights in a network ring 240 may be locally and dynamically adjusted by packets issued by monitors, without the need to implement direct weight control by a central arbitration unit such as e.g. the trace unit 25.

Further, arbitration may be e.g. implemented centrally. Router port weights may be controlled by control packets issued by a central network unit such as, e.g., the trace unit 25. Such control packets may be referred to as port weight setting packets. A port weight setting packet may be e.g. sent from the trace unit 25 to at least one of the plurality of nodes (e.g. routers R1-R4). On receipt of a port weight setting packet, the node addressed by the port weight setting packet may adjust port weights according to weight setting information encoded in the packet. Controlling port weights by control packets transmitted by e.g. trace unit 25 may be used if unfair or privileged arbitration among the monitors M1-M4 of a network ring 240 is desired.

In order to prevent errors caused by non-deterministic arrivals of packets, different priorities may be allocated for packets carrying different information. By way of example, priorities may depend on the monitor state used for the generation of the trace information.

Packets containing trace information generated in the LONG MESSAGE state and/or in the SHORT MESSAGE state are given the lowest priority. Packets containing trace information generated in the STATISTICS states are given the same or higher priority. For packets carrying control information (e.g. time period packets, packets for programming the monitors or for interacting with the functional architecture 10) are given the highest priority. That way, such packets may reach their destinations as soon as possible.

Trace information packetized into a packet and issued by a monitor 21, 22, 23, M1-M4 may be provided with at least one timestamp. The timestamp may be indicative of a time at which the trace information is determined, i.e. at which a particular observation is made. Packets providing statistical trace information as generated e.g. in the mode STATISTICS may be configured to carry two timestamps, one designating the start time of the observation on which the statistical information in mode STATISTICS is generated and one designating the end time of the observation on which the statistical information in mode STATISTICS is generated.

The timestamps carried by the packets may be differential timestamps. Differential timestamps are related to a clock of the subsystem in which they are generated. Differential timestamps may be generated by a counter which counts the clock cycles of the clock of the corresponding subsystem. Each monitor of a network ring 240, 250, 260 (see e.g. FIG. 3) may have access to the counter.

The counter may be one central unit of the corresponding subsystem, i.e. one counter for an entire subsystem may be provided. Such central counter may be shared by all monitors located in the corresponding subsystem. As mentioned earlier, a subsystem may be defined by a specific clock domain, e.g. clock domain CL0, CL1, CL2 or CL3 (see FIG. 3).

The subsystem may comprise multiple counters. In this case, all counters within a subsystem (clock domain) are synchronous. The central counter or the multiple counters may be accessed by the monitors and by the nodes (routers) of the network ring or network rings located in the corresponding subsystem (clock domain).

Figure 9:
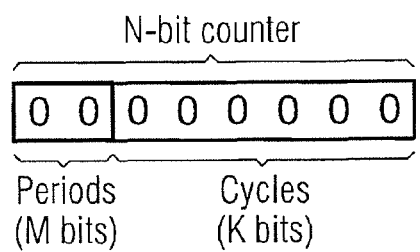
FIG. 9 is a schematic illustration of an exemplary counter for tracking network ring time.

A timestamp may correspond to the value of an N-bit counter as illustrated in FIG. 9. That is, the value of this counter is stamped on the packets emitted by the monitors 21, 22, 23 into the network ring of the corresponding subsystem, e.g. network ring 240 if the subsystem of clock domain CL1 is considered. Additionally, bridge router 241 of the network ring may have access to the counter(s).

In order to decrease the power and semiconductor area consumption, the N-bit counter may be limited to counting only a relatively small range of cycles. By way of example, $N \leq 12$, 10, or 8.

The width N of the N-bit counter defines the maximum range $2^N-1$ of the counter. After counting to this limit, the counter overflows, wraps around and starts anew. The bit counter width N may define the maximum range of the differential timestamp attached to the packet.

The maximum range of the counter may be divided into smaller equal-sized intervals, called periods. By way of example, a period may be defined by K bits. In this case, the count value used as a timestamp for the packets may only be the K bits value of the counter, i.e. may correspond in maximum to a period of $2^K-1$ clock cycles.

In this case, the leading M bits, M=N−K, of the counter are flipped every period. Thus, the leading M bits of the N-bit counter can be viewed as a period counter. The period counter counts the number of overflows of the differential time stamp count of K bits.

The period counter (i.e. the leading M bits of the N-bit counter) may be used to trigger the transmission of a special control packet to trace unit 25. This control packet will be referred to in the following as a time period packet. A time period packet may be emitted at each count of the period counter.

Thus, each subsystem associated with a clock domain CL0, CL1, CL2, CL3 may periodically emit time period packets to trace unit 25. The time period packets report to trace unit 25 that, in a particular subsystem, a period has e.g. ended. Each of N, M, K may be different or identical in at least two or in all subsystems.

For example, as exemplified in FIG. 9, a counter which is able to count 1023 clock cycles can have four such periods, each with a length of 256 cycles. Thus, a time period packet will be emitted by the network ring equipped with such counter every 256 clock cycles.

The one or more (synchronized) counters associated with a subsystem and/or the one or more network rings within this subsystem may be accessible at the node of the network ring(s) and at the monitors. For example, time period packet indicative of the subsystem time may be generated and send out by a bridge router 241, optionally via the main ring 280, to the trace unit 25.

The time period packet contains the address of the source so that the trace unit 25 knows from which subsystem and/or network ring the time period packet has been emitted.

Trace unit 25 may compute the absolute time (also referred to as system time) of an observation based on the differential timestamp contained in a packet and a count of the time period packets received from the subsystem and/or network ring from which the packet has been released. The precise absolute time of the observation of the trace information encapsulated in the packet may e.g. be computed according to $$T(P) = [n \times \Delta(\text{subsystem}) + dTS(P)] \times Tc(\text{subsystem}).$$

Here, T(P) is the absolute observation time of the trace information encapsulated in packet P, n is the number of periods counted at trace unit 25 corresponding to the number of arrivals of time period packets from the subsystem under consideration, A(subsystem) is the duration of a period in clock cycles of the subsystem under consideration and dTS (P) refers to the value of the packet's differential timestamp in clock cycles. As is apparent from the above, the clock cycle period Tc and the period duration in clock cycles K of the counter(s) in each subsystem should be known at trace unit 25. Further, it is to be noted that the absolute time may be computed by other formulas and/or that additional concepts may be used to compute absolute time. By way of example, incoming packets may be aligned to the appropriate period before computing the absolute time. By way of example, trace unit 25 may have counted n1 periods when receiving a packet which was generated e.g. two periods earlier (i.e. in period n1-2) and which arrives late due to latency. In this case, alignment to the correct period n1-2 is possible by observing the current value n1 of the period counter and the period count of the timestamp (e.g. the leading M bits of the timestamp).

Tracing or debugging on the basis of differential timestamps minimizes the complexity of the trace or debug architecture 20. The greater the maximum value of the counter ($2^N$-1) is and the larger the number of periods ($2^M$) is, the more latency of a packet may be tolerated before its absolute time (i.e. system time) is wrongly computed at trace unit 25.

For example, only the K bits may be transmitted as a differential timestamp with the packet. Alternatively, the whole counter value (N bits) may be transmitted as a differential timestamp with the packet. In this case, trace unit 25 can easily determine to which of the periods the packet belongs. Further, trace unit 25 can monitor the approximate actual latency of packet transmission by comparing the leading M bits of the differential timestamp of an incoming packet with the period number n as counted at trace unit 25 on the basis of the time period packets, if used.

In other words, only trace unit 25 may obtain knowledge of the absolute time of observations in the various network rings. In this case, trace unit 25 keeps count of the specific time period packets received from each network ring. The trace unit 25 may then order other packets received from each network ring based on the count of the time period packets and, e.g., on the leading M bit values of the N bit timestamps provided by the packets. As the trace unit 25 has knowledge about the clocking frequency $Tc^{-1}$ in each subsystem and the period range K of the counter(s) in each subsystem, the trace unit 25 may compute the absolute time of each observation reported by each packet from each subsystem. Thus, subsystems may be clocked at different frequencies without affecting the rest of the system, the flow of trace information and the evaluation of the trace information in the trace unit 25.

A control packet indicative of a frequency change in a specific subsystem associated with e.g. a clock domain CL0, CL1, CL2, CL3 may be emitted. In this case, a frequency change in a subsystem results in that the components 1, 2, 3 associated with the subsystem are clocked at the changed frequency. This type of control packet will be referred to in the following as a frequency change packet. Frequency change packets may be used to report to other network entities that, in a particular subsystem, a frequency change has occurred. Thus, a frequency change in a subsystem may trigger the transmission of a frequency change packet.

By way of example, a frequency change packet may carry an (e.g. differential) timestamp which corresponds to the value of the counter(s) associated with the corresponding subsystem (clock domain) sampled at the time of the frequency change. Further, the frequency change packet may contain the address of the source so that the destination unit knows from which subsystem and/or network ring the frequency change packet has been emitted.

Similar to other types of control packets such as, e.g., the time period packets, the frequency change packets may be send out by e.g. a bridge router 241 of the subsystem and/or network ring under consideration. To this end, bridge router 241, which has access to the counter(s) of the subsystem, is informed on the event when the frequency change occurs, and, at that instant, samples the counter to obtain the corresponding timestamp. The frequency change packet may then be transmitted, optionally via main ring 280, to trace unit 25 (or another destination unit). It is assumed that bridge router 241 emitting the frequency change packet is informed on the event when the frequency change occurs by appropriate means, e.g. by a binary frequency change enable signal issued by a control unit (not shown) of the functional architecture 10.

Trace unit 25 (or another destination unit) may use the (e.g. differential) timestamp contained in the frequency change packet to determine the instant at which the multiplier Tc(subsystem) should be changed to the new value corresponding to the new clocking frequency $Tc^{-1}$ of the subsystem (or clock domain) under consideration.

Trace architecture 20 may use a timing protocol which may remain unaffected by a turn off and a boot up of an individual subsystem. Recovery of an individual subsystem after subsystem turn off and subsequent turn on may be accomplished based on the time of the main ring 280 (see e.g. FIG. 3). Main ring 280 may be located in a subsystem in which power is continuously maintained, i.e. which is never turned off. Thus, the counter(s) associated with the main ring 280 are never reset. In one embodiment the counter(s) associated with the main ring 280 may have the same structure as described above and shown in the exemplary illustration of FIG. 9.

When a subsystem is turned off, the counter(s) associated with the network ring(s) residing in the subsystem stop counting for failure of power. Whenever the subsystem is turned on again, the counter(s) associated with the network ring(s) of the subsystem are reset and start counting again, beginning from 0. At that time instance, a signal (e.g. a binary signal switching from 0 and 1) is sent to bridge router 281 on main ring 280, which connects with network ring 240 which is turned on. Bridge router 281 may then generate a specific packet called a wake-up packet. The wake-up packet may carry the current counter value of the counter(s) associated with main ring 280 at the time instance of the signal (e.g. the counter value when the binary signal switched from 0 to 1). Further, it may carry an identifier of the subsystem and/or the network ring of the subsystem which is turned on.

The wake-up packet may be sent to the trace unit 25. On receipt of the wake-up packet, the trace unit 25 becomes informed of the time when the subsystem was turned on (e.g. the time when the turn on procedure started). As the main ring 280 is never turned off (i.e. is continuously operating), this time may be a very accurate estimation of the absolute turn on or boot up time of the subsystem. Absolute time of packets received from the turned on subsystem may then be computed by trace unit 25 the same way as described above, using the wake-up time as a start time offset for the subsystem counter value 0.

Thus, main ring 280 may provide a continuous time basis used as a reference time for computing absolute times from differential timestamps received from the network rings after a subsystem turn off (shut down) and subsequent turn on. In some embodiments, e.g. if no main ring 280 is used, a reference time may be provided by a reference counter connected to the trace unit 25. In this case, the signal which is sent on turn on from the subsystem to the bridge router 281 according to the above description is sent to the trace unit 25 having access to the reference time.

If all the network rings including the main ring 280 are turned off, the produced trace will start anew. In one embodiment trace unit 25 may be informed about such global system turn off. If trace unit 25 is informed about the time of such global turn off, the time information in trace unit 25 concerning the individual network rings could be stored. Trace unit 25 may either be informed on a turn off of the entire system 100 by a turn off message issued by system 100 or by an information obtained from outside of system 100.

The time information stored in trace unit 25 concerning the individual network rings on a global system turn off may be used when the entire system 100 is turned on again. At turn on (boot-up) of system 100, all the counters are reset. As mentioned earlier, counter(s) in each subsystem count always unless there is a turn off in the respective subsystem.

By way of example, a system 100 may comprise two subsystems running at different clocks. Subsystem 1 (e.g. clock domain CL1 in FIG. 3) has a clock with a period of 7 ns and subsystem 2 (e.g. clock domain CL2 in FIG. 3) has a clock with a period of 9 ns. These two subsystems are interconnected by two network rings 240, 250 of trace architecture 20, each running with the clock frequency of the subsystem in which they reside. Main ring 280, bridging the two network rings 240, 250, may e.g. have a clock with a period which is shorter than the clock periods of both network rings 240, 250. By way of example, the clock period of main ring 280 may be 3 ns.

Figure 5:
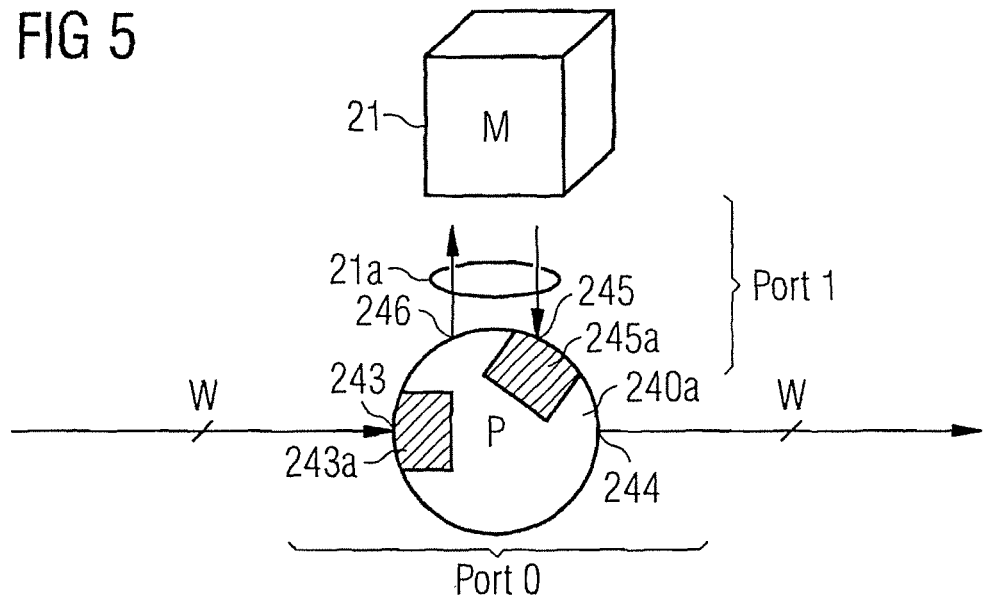
FIG. 5 is a schematic block diagram of a monitor coupled to a network node.

The bit width of some or all links (e.g. network structure 24, router ports Port 0, Port 1, see e.g. FIG. 5 in which the bit width of the network structure 24 and the router Port 0 are denoted by w) may be set to 16 and the input buffers 243 of Port 0 and/or input buffers 245 of Port 1 of all routers may have a depth equal to 3 flits (one flit has 16 data bits). The interconnections from the network rings 240, 250, 260 to the main ring 280 may be accomplished via synchronizers 270, which may also have buffers of a size equal to 3 flits. In order to track time, ten bit counters may be used on all subsystems/network rings. Thus, each counter may have a maximum value of 1023. The highest most two bits are used to count the periods, which results in splitting the maximum value into four periods of equal length of 256 counts.

Figure 10:
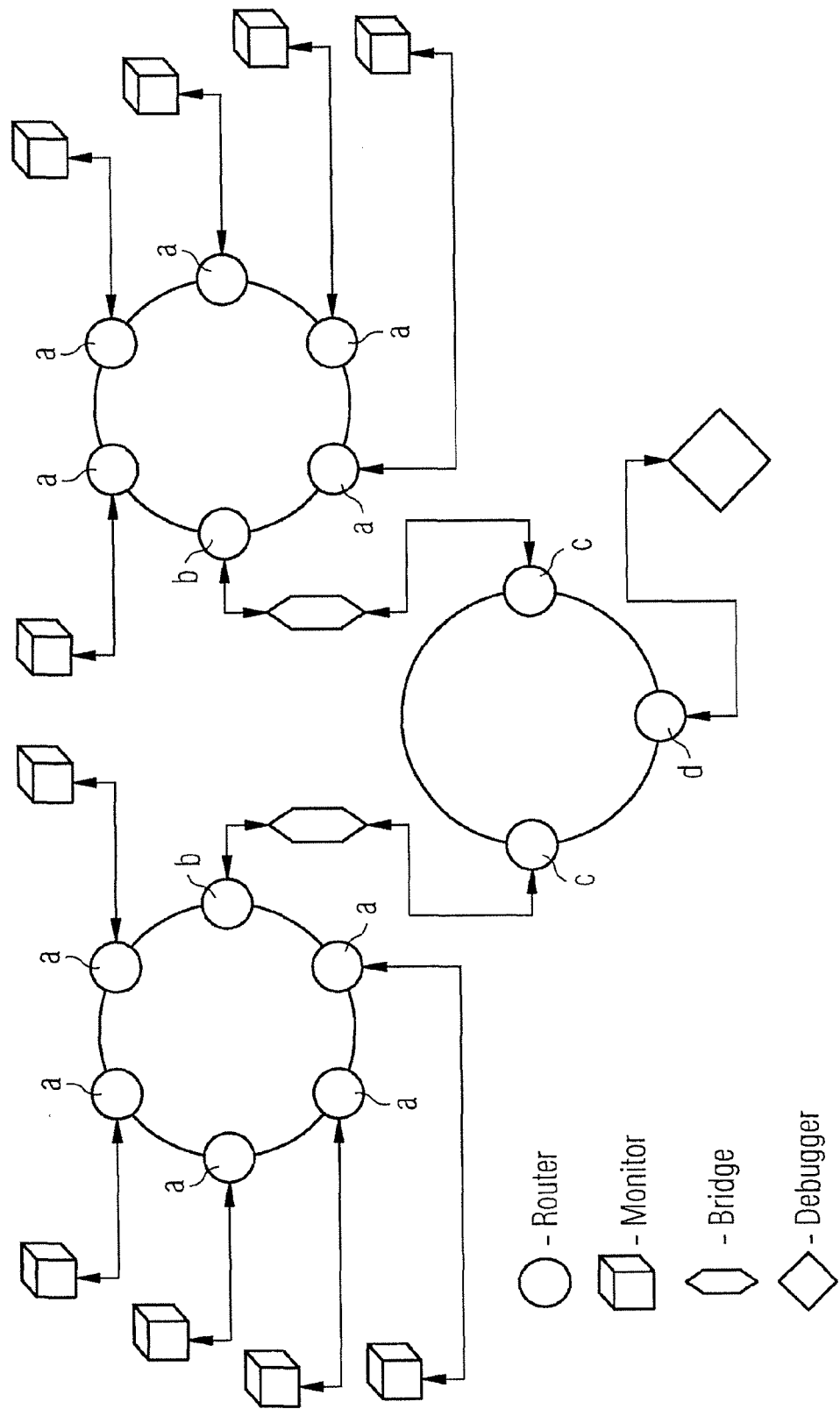
FIG. 10 is a schematic block diagram of an exemplary architecture and topology of trace resources in accordance with the disclosure.

FIG. 10 illustrates an exemplary architecture and topology of a trace architecture 20 in accordance with the disclosure. In this example, each of two subsystems may be associated with one network ring (or, generally, with one network configuration having the topology of e.g. a star, a bus, etc.), and each network ring may have e.g. five monitors. Different types of routers may be used in this embodiment and other embodiments described herein. Routers denoted by "a" may only be capable of forwarding packets. Routers denoted by "b" may be configured to forward packets, to add network ring IDs (identifiers) to addresses and to generate time period packets. Routers denoted by "c" may be configured to forward packets, to detect subsystem turn on and to report subsystem turn on to trace unit 25 by emitting a wake-up packet. Routers denoted by "d" may be configured to forward packets and to generate main ring timing packets. The network rings depicted in FIG. 10 are exemplary and could, be replaced by one or more network configurations having other topologies such as, e.g., a star, a bus, etc.

It is to be noted that counters used to generate the timestamps in different subsystems/network rings can be of different bit width N. Further, each network ring may have a differently sized counter in view of N, K and M. The number N of bits used by the counters specifies the latency that a packet can tolerate before its absolute time is erroneously computed. Therefore, the bit width N is to be determined in view of the specifications of the system. Further, the bit width M of the period counter may also be different for different network rings and specified in view of the system's requirements.

Each monitor may be configured to disregard specific transactions occurring within a pre-defined address space. This may e.g. ensure that secure communications can not be observed by trace unit 25. Thus, the trace interconnect may not cause any security risk. However, it is also possible to have secure and non-secure transactions within the same address space and to guarantee communication's security against trace architecture 20 by other means.

The router connecting trace unit 25 to main ring 280 (or, e.g., another topology type of a central network configuration) may be optional. Instead, a direct connection may be established. In this case, trace unit 25 has to keep track with the counter which defines the time on the main network configuration (e.g. ring 280).

Similarly, bridging routers 241 on the network rings (or, e.g., on other topology types of network configurations) may be optional. In this and e.g. in all other embodiments, no cross-connections between Port 0 and Port 1 of the routers may be provided.

The bit width of all links can be different. That is, the different network rings in the hierarchical topology may operate by using different bit widths on their network structure. Scaling the bit widths effects the throughput of the system. Links with higher bit widths will have higher throughput and higher bandwidths.

Figure 11:
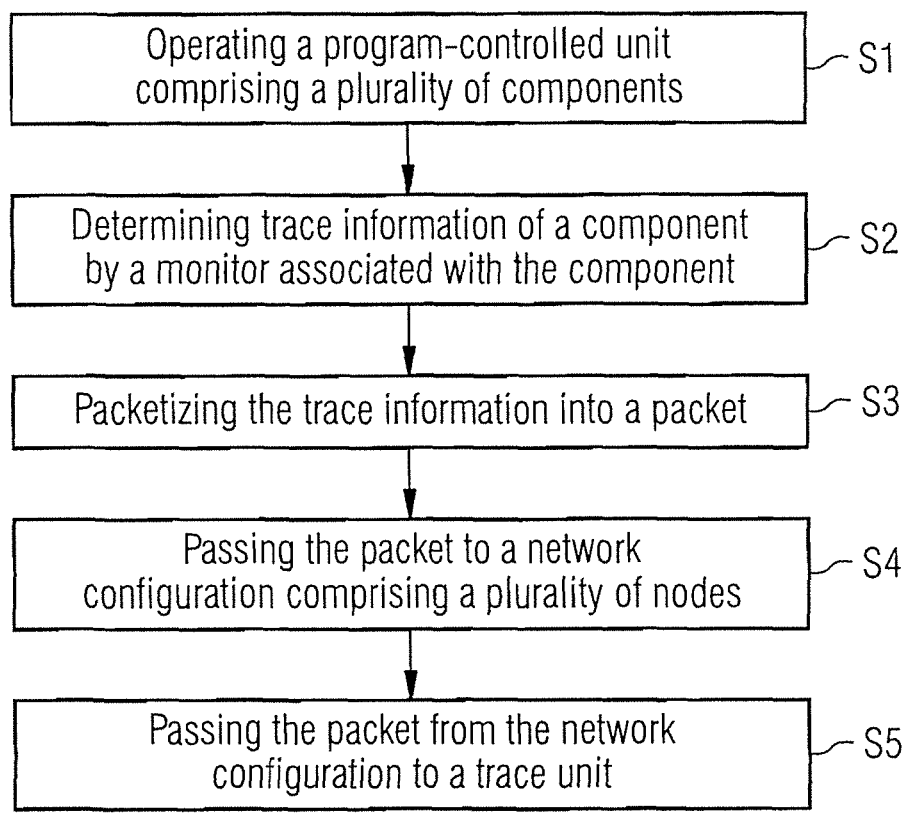
FIG. 11 illustrates a method of handling trace information in accordance with the disclosure.

A method in accordance the disclosure is illustrated in FIG. 11. While the method is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. The method comprises operating a functional unit 10 comprising a plurality of components 1, 2,3 at S1.

At S2, trace information of a component 1, 2, 3 is determined by a monitor 21, 22, 23 associated with the component 1, 2, 3.

The trace information is packetized into a packet at S3, e.g. by binary coding of the trace information and by writing the binary encoded trace information into a trace information data structure provided in the packet.

At S4, the packet is passed to a network configuration, e.g. network ring 240, comprising a plurality of nodes 240a-240e. The packet may then be routed in the network configuration by using an address contained e.g. in a packet header defining its destination.

At S5, the packet is passed from the network configuration (e.g. network ring 240) to a trace unit 25. The trace unit 25 may then process the packet by e.g. analyzing the information (e.g. timestamp(s), trace information, loss statistics, etc.) contained in the packet and may e.g. control network operation, operation of the trace architecture 20 and (optionally) operation of the functional architecture 10 as described above.

Although specific embodiments have been illustrated and described herein, it will be appreciated by those of ordinary skill in the art that a variety of alternate and/or equivalent implementations may be substituted for the specific embodiments shown and described without departing from the scope of the present invention. By way of example, in all embodiments, network configurations exemplified to have a ring topology could be of other topologies, e.g. star or bus. This application is intended to cover any adaptations or variations of embodiments described herein. Therefore, it is intended that this invention is limited only by the claims and the equivalents thereof.

What is claimed is:

1. A system comprising:
a functional unit comprising a plurality of components; and
trace resources for tracking at least one process executed by the functional unit, the trace resources comprising:
a first network configuration having a plurality of first nodes;
a plurality of first monitors, wherein each of the plurality of first monitors is coupled to a first node of the plurality of first nodes and is configured to determine trace information of a component of the plurality of components; and a trace unit coupled to the first network configuration, wherein at least one of the plurality of first monitors is programmable to operate in different monitor modes, wherein the trace information to be packetized is dependent on the monitor mode of operation, and wherein the at least one of the plurality of first monitors is further configured to receive a control packet encapsulating control information indicative of the monitor mode to be set.

2. The system of claim 1, wherein the trace resources further comprise:
 a second network configuration having a plurality of second nodes; and
 a plurality of second monitors, wherein each of the plurality of second monitors is coupled to a second node of the plurality of second nodes and is configured to determine trace information of a component of the plurality of components.

3. The system of claim 2, wherein the trace resources further comprise:
 a main network configuration coupled to the first network configuration, to the second network configuration, and to the trace unit.

4. The system of claim 2, wherein the plurality of first monitors are configured to determine trace information of at least one first component of the plurality of components, the second monitors are configured to determine trace information of at least one second component of the plurality of components, and wherein the at least one first component and the at least one second component are configured to operate on different clocks.

5. The system of claim 1, wherein at least one of the plurality of first monitors is configured to packetize trace information into a packet and to pass the packet to a first node of the first network configuration to which it is coupled.

6. The system of claim 5, wherein the different monitor modes comprise at least one monitor mode in which the trace information comprises statistical information on transactions of processes executed by the functional unit.

7. The system of claim 5, wherein at least one of the plurality of first monitors is configured to provide the packet with at least one timestamp, wherein the timestamp is indicative of a time at which the trace information is determined.

8. The system of claim 1, wherein the plurality of components of the functional unit comprise one or more of a programmable processor, a dedicated hardware block, a memory and an interconnect configured to provide communication between the plurality of components coupled by the interconnect.

9. The system of claim 1, wherein the first network configuration comprises a network ring and is an interconnect infrastructure independent of the functional unit.

10. The system of claim 1, wherein the trace resources form part of a Network-on-a-Chip (NoC) or the functional unit forms part of a System-on-a-Chip (SoC).

11. A method comprising:
 operating a functional unit comprising a plurality of components;
 tracking at least one process executed by the functional unit, by using trace resources, comprising:
 determining trace information of a component of the plurality of components by a monitor associated with the component, wherein a trace unit is coupled to a network configuration comprising a plurality of nodes, the monitor is coupled to a node of the plurality of nodes, and the monitor is programmable to operate in different monitor modes;
 receiving a control packet encapsulating control information indicative of a monitor mode of operation with the component;
 packetizing the trace information into a packet, wherein the trace information to be packetized is dependent on the monitor mode of operation;
 passing the packet to the network configuration; and passing the packet from the network configuration to the trace unit.

12. The method of claim 11, further comprising:
 providing the packet with at least one timestamp, wherein the timestamp is indicative of a time at which the trace information is determined.

13. The method of claim 12, wherein the timestamp is indicative of a differential time relative to a time period of a succession of time periods, further comprising:
 sending a time control packet comprising the timestamp from the network configuration to the trace unit at each time period.

14. The method of claim 13, further comprising:
 computing a system time at which the trace information has been determined based on the timestamp and based on a number of counts of time control packets received at the trace unit.

15. The method of claim 11, further comprising:
 sending a frequency change packet indicative of a frequency change at a component to the trace unit.

16. The method of claim 11, further comprising:
 sending the control packet from the trace unit to the monitor; and
 programming the monitor to operate in the monitor mode set by the control packet, wherein the trace information to be packetized is determined by the monitor mode.

17. The method of claim 11, further comprising:
 sending a state change packet by the monitor into the network configuration in response to a change of the monitor mode; and
 adjusting port weights in at least one node of the network configuration in response to the receipt of a state change packet.

18. The method of claim 11, further comprising:
 sending a port weight setting packet from the trace unit to at least one of the plurality of nodes; and
 adjusting port weights in the at least one of the plurality of nodes in response to the receipt of the port weight setting packet.

19. The method of claim 11, further comprising:
 sending a packet indicative of an incomplete transmittal of trace information by the monitor into the network configuration.

20. A system comprising:
 a functional unit comprising a first functional subsystem and a second functional subsystem wherein the first functional subsystem is clocked by a first clock and the second functional subsystem is clocked by a second clock; and
 trace resources for tracking processes executed by the functional unit, the trace resources comprising:
 a first network ring having a plurality of first nodes;
 a plurality of first monitors, wherein each of the plurality of first monitors is coupled to a first node of the plurality of first nodes and is configured to determine trace information of a component of the first functional subsystem clocked by the first clock;
 a second network ring having a plurality of second nodes;

a plurality of second monitors, wherein each of the plurality of second monitors is coupled to a second node of the plurality of second nodes and is configured to determine trace information of a component of the second functional subsystem clocked by the second clock, the first and second clocks are at least temporarily different; and a trace unit coupled to the first network ring and to the second network ring.

21. The system of claim 20, wherein the first network ring is clocked by the first clock and the second network ring is clocked by the second clock.

22. The system of claim 20, wherein the first network ring is powered by a first power supply and the second network ring is powered by a second power supply, wherein the first and second power supplies are configured to be independently turned off or turned on.

* * * * *